(12) United States Patent
Kasravi et al.

(10) Patent No.: US 8,255,309 B2
(45) Date of Patent: Aug. 28, 2012

(54) VALUATING INTELLECTUAL ASSETS

(75) Inventors: Kas Kasravi, Bloomfield, MI (US);
Timothy M. Thomas, Raleigh, NC (US); Becky S. Fockler, Herndon, VA (US); Nancy G. Moeller-Olsen, San Diego, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 304 days.

(21) Appl. No.: 12/505,708

(22) Filed: Jul. 20, 2009

(65) Prior Publication Data

US 2011/0016059 A1    Jan. 20, 2011

(51) Int. Cl.
*G06Q 40/00* (2012.01)
(52) U.S. Cl. .................................... 705/36 R
(58) Field of Classification Search ............ 705/36 R
See application file for complete search history.

(56) References Cited

U.S. PATENT DOCUMENTS

| | | | | |
|---|---|---|---|---|
| 5,806,047 A * | 9/1998 | Hackel et al. | ............... | 705/36 R |
| 6,665,656 B1 * | 12/2003 | Carter | ............... | 707/748 |
| 7,188,069 B2 * | 3/2007 | Hagelin | ............... | 705/310 |
| 2005/0071174 A1 * | 3/2005 | Leibowitz et al. | ............... | 705/1 |
| 2005/0261927 A1 * | 11/2005 | Bilak et al. | ............... | 705/1 |
| 2007/0083454 A1 * | 4/2007 | Anderson et al. | ............... | 705/36 R |
| 2009/0055226 A1 * | 2/2009 | Tritz et al. | ............... | 705/4 |
| 2010/0179922 A1 * | 7/2010 | Brandhorst | ............... | 705/36 R |

OTHER PUBLICATIONS

Titman et al.:Relative valuation using market comparables, Jul. 2007, pp. 1-43.*
Viswanath, P.V.: Optimal Portfolio Construction and Selection, 1998, pp. 1-9.*
Wilhelm et al.: Dawn of New Asset Class, Oct./Nov. 2005, IP Finance/Intellect Asset Management, Management Report, pp. 59-62.*
Chaplinsky, S: Methods of Intellectual Property Valuation, 2002, University of Virginia Darden School Foundation, pp. 1-12.*
Kamiyama et al., Valuation and Exploitation of Intellectual Property, STI Working Paper May 2006 (Jun. 30, 2006) (48 pages).
Flignor et al., Intangible Asset & Intellectual Property Valuation: A Multidisciplinary Perspective, Jun. 2006 (17 pages).
Burgman et al., The Creation, Valuation and Disclosure of Intellectual Assets through Enhanced Business Reporting (8 pages) 2007.

* cited by examiner

*Primary Examiner* — Bijendra K Shrestha

(57) ABSTRACT

To valuate intellectual assets in a portfolio, a corresponding group of parameters is associated with each of the intellectual assets. Weights are associated with the parameters of each of the groups. Based on a predetermined value of a single one of the intellectual assets or of a collection of the intellectual assets, corresponding values of the intellectual assets are computed using the weights associated with the parameters of the corresponding groups.

15 Claims, 3 Drawing Sheets

VALUATING INTELLECTUAL ASSETS

BACKGROUND

In a typical enterprise, such as a company, educational organization, government agency, and so forth, there may be a relatively large number of intellectual assets. An intellectual asset is any intangible work product, which can be recorded in the form of documents, files, drawings, schematics, patents, source code, and so forth.

Such intellectual assets usually have value. However, it is relatively difficult to valuate such intellectual assets of an enterprise.

BRIEF DESCRIPTION OF THE DRAWINGS

Some embodiments of the invention are described with respect to the following figures.

DETAILED DESCRIPTION

Figure 2:
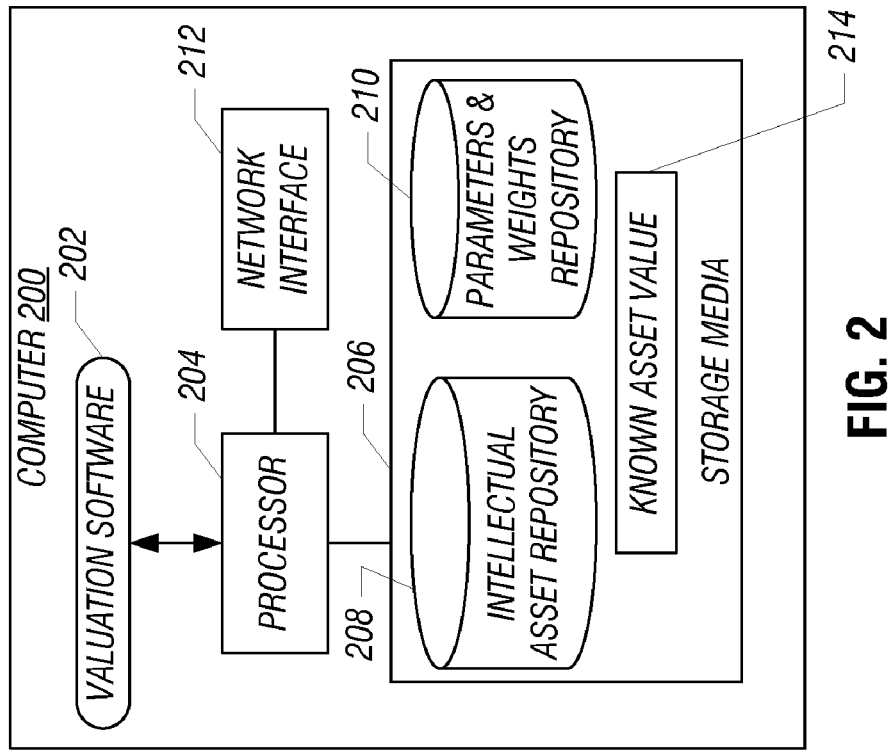
FIG. 2 is a block diagram of a computer that incorporates an embodiment of the invention.

Traditional techniques of valuating intellectual assets are typically associated with inconsistent valuations across different types of intellectual assets. Moreover, traditional valuation techniques also do not provide a traceable logic for valuating intellectual assets, such that users may not be able to later determine the rationale for an established valuation of an intellectual asset. In addition, traditional valuation techniques may be labor intensive since the valuations are typically manually performed by experts within the enterprise.

In accordance with some embodiments, a mechanism or technique is provided to valuate intellectual assets associated with an enterprise in a consistent, auditable, and traceable manner. To enable valuation of the intellectual assets in an automated manner, each intellectual asset is associated with a group of parameters having corresponding weights. The group of parameters associated with each intellectual asset describe corresponding characteristics or properties of the intellectual asset. As examples, parameters can include at least some of the following: type (to indicate the type of intellectual asset), size (to indicate the size of the intellectual asset), format (to indicate the format of the intellectual asset), authorship (to indicate the author(s) of the intellectual asset), business impact (to indicate the level of impact that the intellectual asset has on the business goals of an enterprise), creativity (to indicate the level of creativity involved in creating the intellectual asset), complexity (to indicate how complex the intellectual asset is), usage (to indicate the level of usage, whether highly used or infrequently used), date of creation, security level, and so forth.

The parameters associated with intellectual assets may be hierarchical, in that at least some of the parameters may have sub-parameters, which in turn may further have additional sub-parameters. As used here, the term "parameter" is intended to refer to a parameter at the highest level of a hierarchy, or to any sub-parameter at any level of the hierarchy. In effect, each intellectual asset is represented by a vector of parameters that collectively describe the intellectual asset.

The weights associated with the parameters for each intellectual asset provide an indication of the relative contribution of the corresponding parameter to the value of the intellectual asset. For example, the "business impact" parameter may have a higher weight than the "format" parameter of the intellectual asset, since the "business impact" parameter may be more indicative of how much value an enterprise can derive from the intellectual asset.

The weights may be in one or more of the following forms: (1) numerical values, (2) conditional statements (which assign numerical values based on satisfaction of one or more conditions), (3) functions (which receive inputs and provide outputs that are the weight values), (4) heuristics (rules-of-thumb or techniques of deriving values based on experience), and so forth.

Figure 1:
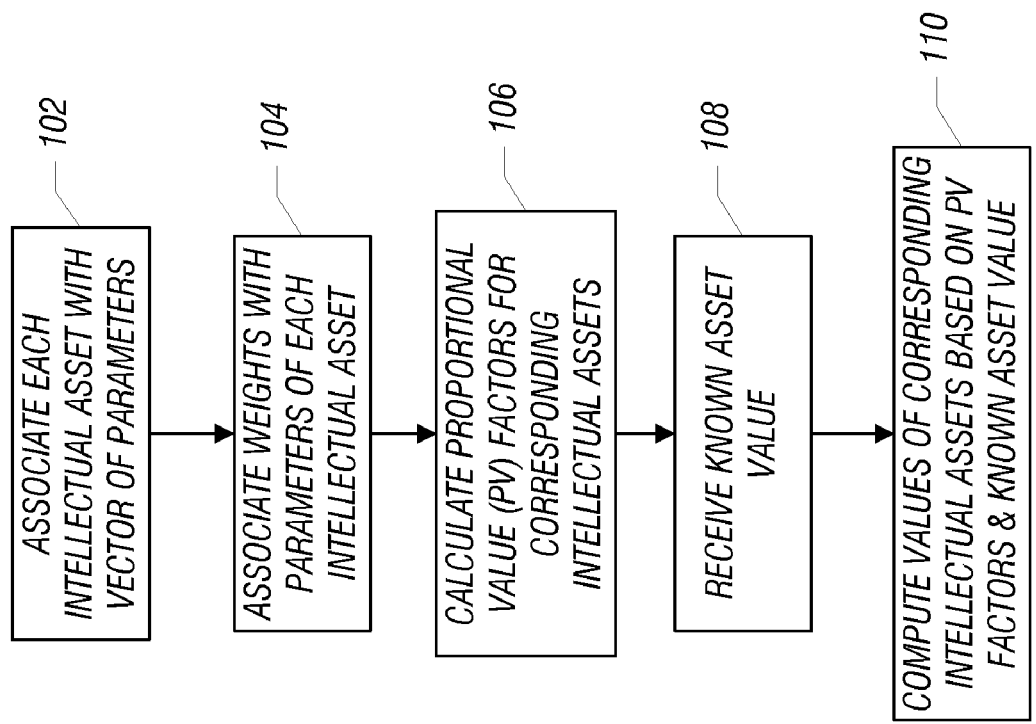
FIG. 1 is a flow diagram of a general process of valuating intellectual assets, according to an embodiment.

FIG. 1 is a flow diagram of a general process according to an embodiment. Each intellectual asset of a portfolio of intellectual assets is associated (at 102) with a vector of parameters, where the parameters can be a hierarchical arrangement of parameters and sub-parameters, or alternatively, the parameters can be parameters at just one level. As noted above, an "intellectual asset" refers to any intangible work product, which can be recorded in the form of documents, files, drawings, schematics, patents, source code, and so forth.

Next, weights are associated (at 104) with the parameters in each vector for each corresponding intellectual asset. The weights can be assigned to the parameters based on a training set of intellectual assets that have corresponding values. Alternatively, the weights can be assigned to the parameters based on expert knowledge or empirical data. As yet another alternative, the weights can be assigned based on both a training set and expert knowledge and/or empirical data. For example, the initial weights may be computed using a training set. Then, the output asset values are reviewed by experts, with the expert knowledge used to refine the weights.

Using the weights associated with parameters in each vector for a corresponding intellectual asset, a proportional value (PV) factor for each intellectual asset is calculated (at 106). The PV factors associated with the corresponding intellectual assets of the portfolio provide indicators of relative valuations among the intellectual assets. In some embodiments, a higher PV factor for a first intellectual asset indicates that the first intellectual asset has a higher value relative to a second intellectual asset that has a lower PV factor.

A known asset value (which is also referred to as a "fixed value anchor point") is received (at 108), where the known asset value can be the known value for a single intellectual asset or for the entire portfolio of intellectual assets. For example, an enterprise may have knowledge that a particular intellectual asset in the portfolio has a certain known value, based on historical information or based on targets of the enterprise. Alternatively, the enterprise may have knowledge of the value of the entire portfolio of intellectual assets, but may not have knowledge of values of individual intellectual assets. As another alternative, the known asset value can be for some collection of the intellectual assets, where the collection can be of the entire portfolio of intellectual assets, or of a subset of the portfolio.

Based on the known asset value and the PV factors, the values of corresponding intellectual assets in the portfolio are computed (at 110). These computed values can then be output, such as in a report.

In one example, the flow of FIG. 1 can be performed by a computer 200 as shown in FIG. 2. The computer 200 includes valuation software 202 executable on a processor 204 to assign values to intellectual assets according to some embodiments. The processor 204 is connected to storage media 206 that has an intellectual asset repository 208 (to store a portfolio of intellectual assets), a parameters and weights repository 210 (to store parameters associated with each intellectual asset and the weights assigned to those parameters), and a known asset value 214. The storage media 206 can be implemented with one or more disk-based storage devices and/or one or more integrated circuit or semiconductor memory devices.

The computer 200 also includes a network interface 212 to allow the computer 200 to communicate over a data network. The network interface 212 can be used to provide information regarding intellectual assets to the computer 200, and to provide outputs of valuations performed by the valuation software 202 to remote locations.

Although FIG. 2 shows the computer 200 as a single block, it is noted that the "computer" 200 can also cover multiprocessing systems that are implemented with multiple computer nodes, which may distributed over one or more networks.

An exemplary table is provided below to illustrate parameters associated with an intellectual asset and the corresponding weights assigned to such parameters. In Table 1, the first column represents the main parameters (the parameters at the top level of the hierarchy). The main parameters include an "industry" parameter, a "type" parameter, a "size" parameter, a "format" parameter, a "creativity" parameter, and an "age" parameter. The second column of Table 1 contains exemplary parameter weights that have been assigned to the parameters in the first column.

TABLE 1

| Parameter | Parameter Weight | Sub-Parameter | Sub-Parameter Weight |
|---|---|---|---|
| Industry | 10 | Energy | 0.5 |
| | | Financial | 0.7 |
| | | Healthcare | 0.9 |
| | | Manufacturing | 0.4 |
| | | Transportation | 0.45 |
| Type | 5 | Framework | 0.8 |
| | | Service Offering | 1.2 |
| | | Whitepaper | 0.3 |
| Size | 6 | Small | 0.1 |
| | | Medium | 0.5 |
| | | Large | 1 |
| Format | 4 | Active Server Page | 1 |
| | | Collection | 0.8 |
| | | Excel | 0.4 |
| | | PowerPoint | 0.2 |
| | | MS Visio | 0.6 |
| | | MS Word | 0.2 |
| | | PDF | 0.2 |
| Creativity | 5 | Mainstream | 0.2 |
| | | Emerging | 0.6 |
| Age (years) | Multiplier | 1 | 1/log (Age + 1) |
| | | 2 | |
| | | 3 | |
| | | 4 | |
| | | 5 | |

Column 3 of Table 1 contains sub-parameters associated with the parameters of Table 1, and column 4 contains the sub-parameter weights assigned to the corresponding sub-parameters of column 3. In the example of Table 1, the "age" parameter is represented as a multiplier, where an age associated with the intellectual asset (column 3 shows the age as being 1, 2, 3, 4, or 5 years) causes application of a multiplier to a sub-parameter weight-in the example of Table 1, the multiplier is 1/log (age+1). In other examples, other multipliers can be used.

Figure 3:
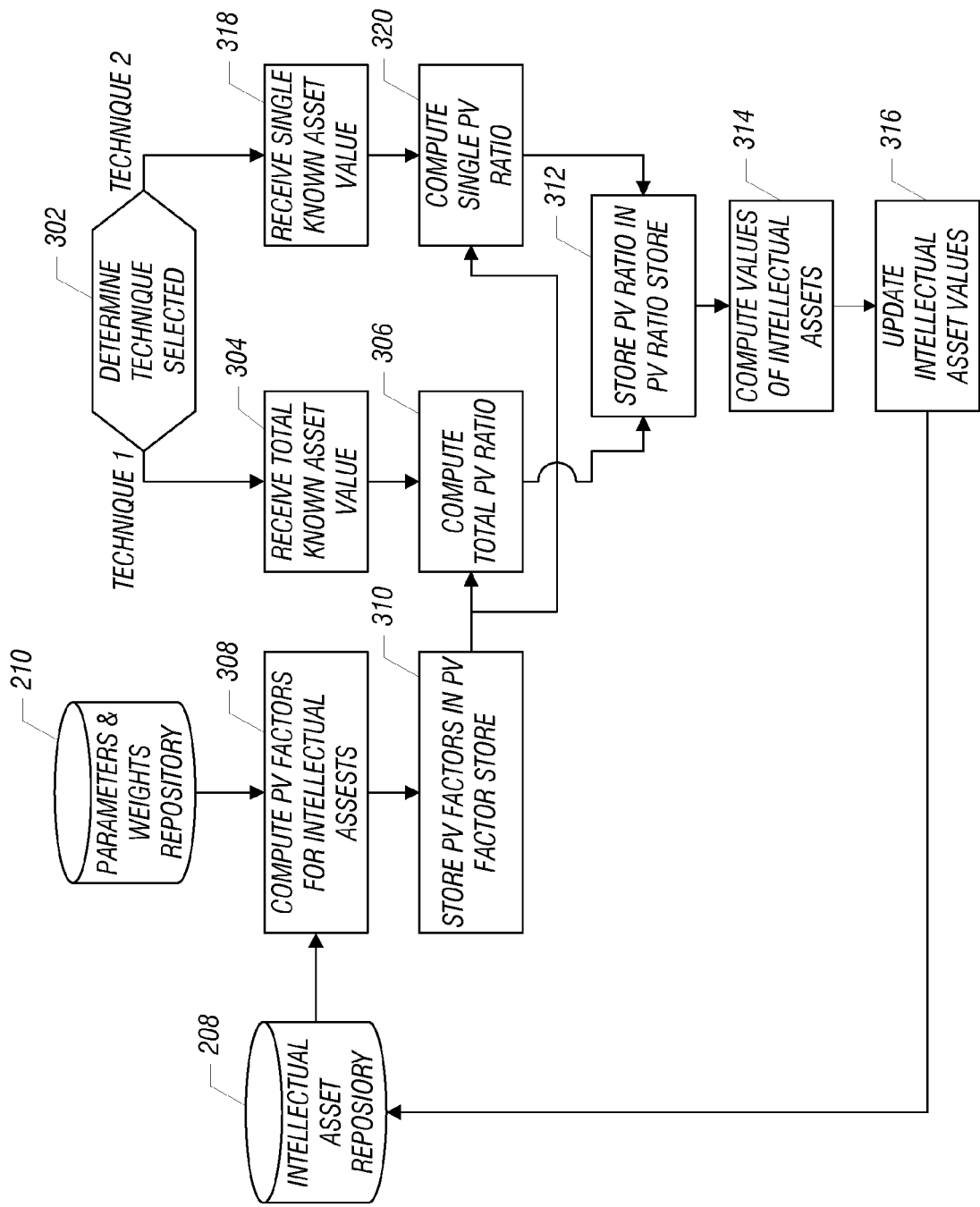
FIG. 3 is a flow diagram of valuating intellectual assets according to another an embodiment.

FIG. 3 shows a process of valuating intellectual assets according to a further embodiment. In one example, the process of FIG. 3 can be performed by the valuation software 202 in FIG. 2. As discussed above, valuation of intellectual assets is based on computing PV factors for respective intellectual assets, where the PV factors provide indicators of relative valuations among the intellectual assets. As shown in FIG. 3, the valuation software computes (at 308) the PV factors for respective intellectual assets of the portfolio (as stored in the intellectual asset repository 208) using corresponding vectors of parameters (and assigned weights), as stored in the parameters and weights repository 210.

The computed PV factors are stored (at 310) in a PV factor store for further use in the process of FIG. 3.

Two techniques are available for valuating intellectual assets. A first technique (technique 1) is based on using a total known asset value, which is the total value associated with the entire portfolio of intellectual assets. A second technique (technique 2) is based on a single known asset value, which is the value of a single intellectual asset. A selection can be made between technique 1 or technique 2, where the selection can be made by a user or by an application.

The valuation software 202 determines (at 302) whether technique 1 or technique 2 has been selected. Assuming that technique 1 is selected, the valuation software 202 receives (at 204) the total known asset value (known asset value of the entire portfolio of intellectual assets). Based on the received total known asset value, a total proportional value (PV) ratio is computed (at 306). The PV ratio is computed by dividing the total known asset value by the sum of the PV factors (retrieved from the PV factor store) for all the intellectual assets in the portfolio, as follows:

$$\text{Total } PV \text{ Ratio} = \frac{\text{Total Known Asset Value}}{\sum PV \text{ Factors}(i)}.$$

In the equation above, the denominator is the sum of all PV factors for all the corresponding intellectual assets (i) in the portfolio. This equation effectively produces a value (expressed in terms of dollars or other currencies, for example) per unit of the PV factor.

For example, if the total known asset value for the entire portfolio is $5,000,000, and the sum of the PV factors of all intellectual assets in the portfolio is 5,000, then the PV ratio would be 1,000 ($5,000,000/5,000). This PV ratio can then be used to compute the value of any particular intellectual asset with an associated PV factor, by multiplying the PV factor of the particular intellectual asset with the PV ratio.

The total PV ratio that is computed at 306 is stored (at 312) in a PV ratio store. Next, the values of the intellectual assets are computed (at 314) using the individual PV factors for corresponding intellectual assets and the PV ratio. The computation of the value of intellectual asset (i) is according to the following equation:

Intellectual Asset Value(i)=Total PV Ratio×PV Factor (i), where Intellectual Asset Value(i) represents the value of intellectual asset i, and PV factor(i) represents the PV factor for intellectual asset i as stored in the PV factor store.

Based on the computed intellectual asset values, an intellectual asset value update is performed (at 316) to update the intellectual asset repository 208, which can store the computed values along with the corresponding intellectual assets in the repository 208.

As further shown in FIG. 3, if technique 2 is selected (as determined at 302), then the single known asset value (associated with a single intellectual asset) is received (at 318). A single PV ratio is then computed (at 320), where the single PV ratio is computed as follows:

$$\text{Single PV Ratio} = \frac{\text{Single Known Asset Value}}{\text{PV Factor(of Single Intellectual Asset)}}$$

The computed single PV ratio is stored (at 312) in the PV ratio store, and tasks 314 and 316 are performed using the single PV ratio.

With technique 2, the known asset value of the single intellectual asset is used to compute the PV ratio, which provides the value per unit of the PV factor. For example, if a single intellectual asset has a known value of $7,000, and the PV factor of this single intellectual asset is 20, then the PV ratio would be 350 ($7,000/20).

Technique 2 is contrasted with technique 1, in which the total known asset value of the entire portfolio of intellectual assets is used to calculate the PV ratio. Although not shown, a third technique may be available, in which the combined value of a subset of intellectual assets is known. This combined value can then be divided by the sum of the PV factors of the intellectual assets in this subset to obtain the PV ratio.

In accordance with alternative embodiments, one or more of the intellectual assets in the portfolio of intellectual assets may have fixed (or locked) values. The values of such intellectual assets may be locked based on contractual obligations, target values desired by the enterprise, or based on other considerations.

Figure 4:
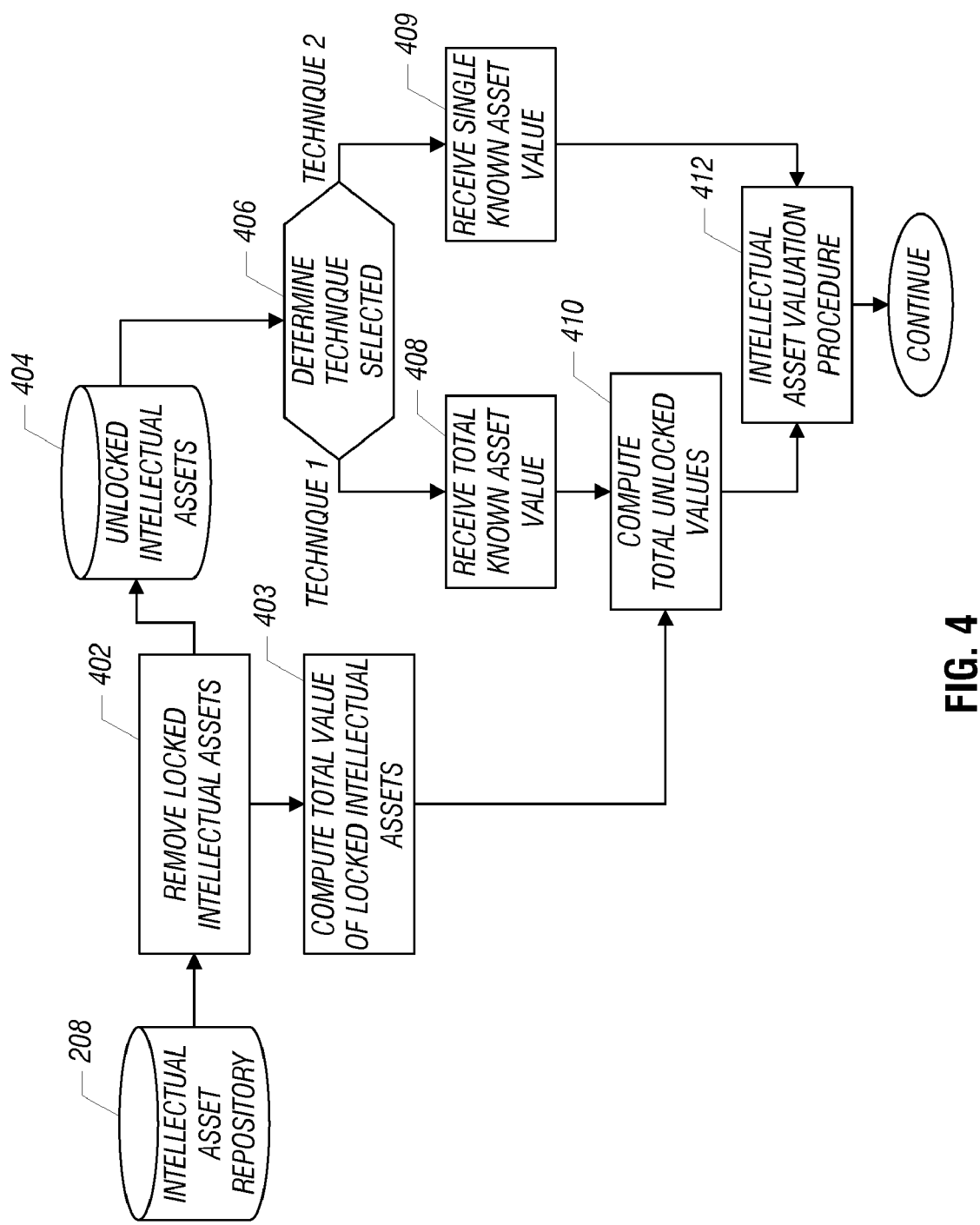
FIG. 4 is a flow diagram of valuating intellectual assets according to a further embodiment.

FIG. 4 illustrates a process (which can be performed by the valuation software 202, for example) of valuating intellectual assets where some of the intellectual assets have locked values. As shown in FIG. 4, the locked intellectual assets are removed (at 402) from the portfolio of intellectual assets (208), with the remaining intellectual assets provided as unlocked intellectual assets 404. The valuation performed is then applied with respect to the unlocked intellectual assets 404 rather than against the entire portfolio of intellectual assets.

As further shown in FIG. 4, the total value (referred to as the "total locked value") of the locked intellectual assets is computed (at 403). Note that the locked intellectual assets have known values, so the total locked value of the locked intellectual assets can be a simple sum of the values of the individual locked intellectual assets.

A determination is made (at 406) regarding whether technique 1 or technique 2 is selected. If technique 1 is selected, then the total known asset value is received (at 408). As discussed above, the total known asset value is the value of the entire portfolio of intellectual assets. Based on the total known asset value and the total locked value computed at 403, the total unlocked value of the unlocked intellectual assets 404 is computed (at 410) by subtracting the total locked value from the total known asset value. The total unlocked value is then provided to an intellectual asset valuation procedure (412), which is similar to tasks 306, 312, 314, and 316 in FIG. 3 in which the total unlocked value is used rather than the total known asset value.

If technique 2 is selected at the determination made at 406, then the single intellectual asset is received (at 409), and this single intellectual asset value is provided to the intellectual asset valuation procedure (412) that is similar to the tasks 320, 312, 314, and 316 performed in FIG. 3.

Note that the processes of FIGS. 3 and 4 can be repeated if parameters and/or weights of intellectual assets are updated.

By using the algorithms depicted in FIG. 3 or 4 above, a consistent, traceable, and auditable approach of valuating intellectual assets is provided.

Instructions of software described above (including the valuation software 202 of FIG. 2) are loaded for execution on a processor (such as processor 204 in FIG. 2). The processor includes microprocessors, microcontrollers, processor modules or subsystems (including one or more microprocessors or microcontrollers), or other control or computing devices. As used here, a "processor" can refer to a single component or to plural components (e.g., one or more CPUs in one or more computers).

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of valuating intellectual assets in a portfolio, comprising:

associating, with each intellectual asset in the portfolio, a corresponding group of parameters, wherein intellectual asset properties are described by the corresponding group of parameters;

associating a weight with each parameter, the weight to indicate a relative contribution of the parameter to a value of the corresponding intellectual asset, wherein at least one of the parameters in a group of parameters is hierarchical having one or more sub parameters, and each of the parameters in the hierarchy is associated with a corresponding weight;

determining a proportion indicator for each intellectual asset in the portfolio, the proportion indicator for a particular intellectual asset based on the weights associated with the parameters in the corresponding group;

computing a value ratio representing a value per unit of the proportion indicators; and based on a predetermined value and the proportion indicator of a single one of the intellectual assets, or based on a predetermined value of a collection of the intellectual assets and a sum of the proportion indicators for the intellectual assets in the collection, computing, by a computer, corresponding values of the intellectual assets, wherein the value of each intellectual asset is computed by multiplying the proportion indicator for the particular intellectual asset by the value ratio.

2. The method of claim 1, wherein the proportion indicators are factors representing relative valuations among the intellectual assets in the portfolio.

3. The method of claim 1, wherein computing the value ratio comprises dividing the predetermined value of the collection of the intellectual assets by a sum of the proportion indicators of the intellectual assets in the collection.

4. The method of claim 3, wherein the collection of intellectual assets is the portfolio of intellectual assets.

5. The method of claim 1 wherein computing the value ratio comprises dividing the predetermined value of the single intellectual asset by the proportion indicator of the single intellectual asset.

6. The method of claim 1, further comprising determining the weights to associate with the parameters of the corresponding groups using a training set of intellectual assets with known values.

7. The method of claim 1, further comprising determining the weights to associate with the parameters of the corresponding groups using expert knowledge.

8. The method of claim 1, further comprising:
initially determining the weights to associate with the parameters of the corresponding groups using a training set of intellectual assets with known values; and
updating the initially determined weights using expert knowledge.

9. The method of claim 1, further comprising:
identifying one or more additional intellectual assets with corresponding one or more locked values,
wherein the predetermined value of the collection of intellectual assets is based on a total value of all intellectual assets in the portfolio less the one or more values of the one or more additional intellectual assets.

10. A computer comprising:
a storage media to store a portfolio of intellectual assets; and
a processor to:
compute indicators of proportional values of the intellectual assets using weights assigned to parameters associated with each of the intellectual assets, wherein the computed indicators represent relative valuations among the intellectual assets in the portfolio, the parameters describe properties of a corresponding intellectual asset, and the weights assigned to the parameters are based on relative contribution of the corresponding parameters to the value of the corresponding intellectual asset, and wherein at least one of the parameters in a group of parameters is hierarchical having one or more sub parameters, and each of the parameters in the hierarchy is associated with a corresponding weight;
receive a known asset value of one or more of the intellectual assets;
use the known asset value of one or more of the intellectual assets to compute a value ratio, the value ratio representative of a value per unit of the proportion indicators,
use the known asset value and the computed indicators to compute values of corresponding ones of the intellectual assets in the portfolio, wherein the value of each intellectual asset is computed by multiplying the indicator of the proportional value for the intellectual asset by the value ratio.

11. The computer of claim 10, wherein the known asset value is the known asset value of the entire portfolio of intellectual assets, and wherein the value ratio is computed by dividing the known asset value by a sum of the indicators of the intellectual assets in the portfolio.

12. The computer of claim 10, wherein the known asset value is the known asset value of a single intellectual asset, and wherein the value ratio is computed by dividing the known asset value by the indicator of the single intellectual asset.

13. An article comprising at least one non-transitory computer-readable storage medium containing instructions that upon execution cause a computer to:
associate, with each of the intellectual assets, a corresponding group of parameters, wherein intellectual asset properties are described by the corresponding group of parameters;
associate a weight with each parameter, the weight to indicate a relative contribution of the parameter to a value of the corresponding intellectual asset, wherein at least one of the parameters in a group of parameters is hierarchical having one or more subparameters, and each of the parameters in the hierarchy is associated with a corresponding weight;
compute a proportion indicator for each intellectual asset in the portfolio, the proportion indicator for a particular intellectual asset based on the weights associated with the parameters in a corresponding group;
compute a value ratio based on a known value, wherein the value ratio represents a value per unit of the proportion indicator; and
based on the known value of a single one of the intellectual assets and the proportion indicator for the single one of the intellectual assets, or based on the known value of a collection of the intellectual assets and a sum of the proportion indicators for the intellectual assets in the collection, compute corresponding values of the intellectual assets, wherein the value of each intellectual asset is computed by multiplying the value ratio and the proportion indicator corresponding to the particular intellectual asset.

14. The method of claim 1 further including selecting, using the computer, to either compute the value of the single one of the intellectual assets or to compute the value of each of the intellectual assets in the collection.

15. The method of claim 14 wherein computing the value of each of the intellectual assets in the collection is selected, and wherein just the predetermined value of the entire collection of the intellectual assets is known and not the predetermined values of the individual assets in the collection.

* * * * *